US006887283B1

(12) United States Patent
Ginosar et al.

(10) Patent No.: US 6,887,283 B1
(45) Date of Patent: May 3, 2005

(54) PROCESS FOR PRODUCING BIODIESEL, LUBRICANTS, AND FUEL AND LUBRICANT ADDITIVES IN A CRITICAL FLUID MEDIUM

(75) Inventors: Daniel M. Ginosar, Idaho Falls, ID (US); Robert V. Fox, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 0 days.

(21) Appl. No.: 09/554,708

(22) PCT Filed: Jul. 22, 1999

(86) PCT No.: PCT/US99/16669

§ 371 (c)(1),
(2), (4) Date: Jul. 31, 2000

(87) PCT Pub. No.: WO00/05327

PCT Pub. Date: Feb. 3, 2000

Related U.S. Application Data

(60) Provisional application No. 60/094,076, filed on Jul. 24, 1998.

(51) Int. Cl.⁷ ........................ C10L 1/18; C10M 105/32; C11C 3/02
(52) U.S. Cl. ........................ 44/388; 508/463; 554/167; 554/170; 554/174
(58) Field of Search ............................ 508/463; 44/385, 44/388; 554/167, 170, 174

(56) References Cited

U.S. PATENT DOCUMENTS

| | | | | |
|---|---|---|---|---|
| 4,164,506 A | * | 8/1979 | Kawahara et al. | 260/410.9 |
| 4,695,411 A | * | 9/1987 | Stern et al. | 260/410.9 |
| 4,698,186 A | * | 10/1987 | Jeromin et al. | 260/421 |
| 4,792,418 A | | 12/1988 | Rubin et al. | 260/412 |
| 4,839,287 A | * | 6/1989 | Holmberg et al. | 435/134 |
| 5,219,744 A | * | 6/1993 | Kurashige et al. | 435/135 |
| 5,288,619 A | | 2/1994 | Brown et al. | 435/134 |
| 5,424,466 A | | 6/1995 | Stern et al. | 554/175 |
| 5,424,467 A | | 6/1995 | Bam et al. | 554/216 |
| 5,480,787 A | * | 1/1996 | Negishi et al. | 435/134 |
| 5,520,708 A | * | 5/1996 | Johnson et al. | 44/386 |
| 5,525,126 A | * | 6/1996 | Basu et al. | 44/308 |
| 5,578,090 A | * | 11/1996 | Bradin | 44/308 |
| 5,599,358 A | * | 2/1997 | Giavazzi et al. | 44/388 |
| 5,697,986 A | * | 12/1997 | Haas | 44/308 |
| 5,713,965 A | * | 2/1998 | Foglia et al. | 44/388 |
| 6,201,144 B1 | | 3/2001 | Isbell et al. | 554/213 |

FOREIGN PATENT DOCUMENTS

| | | | |
|---|---|---|---|
| JP | 09157684 A | * | 6/1997 |
| WO | WO 00/05327 | * | 3/2000 |

OTHER PUBLICATIONS

JP07062385A Abstract (English), Jul. 3, 1995.*

JP63112536A Abstract (English), Nov. 05, 1988.*

(Attachment Sheets 2–5).

William B. Nilsson, Erich J. Gauglitz, Jr. and Joanne K. Hudson, Solubilities of Mehtyl Oleate, Oleic Acid, Oleyl Glycerols, and Oleyl Glycerol Mixtures in Supercritical Carbon Dioxide, Journal of the American Oil Chemists Society, JAOCS, vol. 68, No. 2 (Feb. 1991) pp. 87–91.

Zer–Ran Yu, Syed S. H. Rizvi, and John A. Zollweg, Enzymatic Esterification of Fatty Acid Mixtures from Milk Fat and Anyhydrous Milk Fat with Canola Oil in Supercritical Carbon Dioxide, Biotechnology Progress, 1992, vol. 8, No. 6, 508–513.

A. Marty, W. Chulalaksananukui, R.M. Willemot, and J. S. Condoret, Kinetics of Lipase–Catalyzed Esterification in Supercritical CO2, Biotechnology and Bioengineering, vol. 39, pp. 273–280 (1992).

A. Marty, W. Chulalaksananukul, J. S. Condoret, R.M. Willemot, and G. Durand, Comparison of Lipase–catalysed Esterification in Supercritical Carbon Dioxide and in n–Hexane, Biotechnology Letters, vol. 12, No. 1, pp. 11–16 Jan. (1990).

Pasta, P. Mazzola G., Carrea G. and Riva S., Subtilisin–catayzed Transesterification in Supercritical Carbon Dioxide, Biotechnology Letters, vol. 11, No. 9, pp. 643–648 (1989).

Michael A. Jackson and Jerry W. King, Methanolysis of Seed Oils in Flowing Supercritical Dioxide, Journal of the American Oil Chemists Society, vol. 73, No. 3 (1996).

(Continued)

Primary Examiner—Cephia D. Toomer
(74) Attorney, Agent, or Firm—Trask Britt, PC

(57) ABSTRACT

A process for producing alkyl esters useful in biofuels and lubricants by transesterifying glyceride- or esterifying free fatty acid-containing substances in a single critical phase medium is disclosed. The critical phase medium provides increased reaction rates, decreases the loss of catalyst or catalyst activity and improves the overall yield of desired product. The process involves the steps of dissolving an input glyceride- or free fatty acid-containing substance with an alcohol or water into a critical fluid medium; reacting the glyceride- or free fatty acid-containing substance with the alcohol or water input over either a solid or liquid acidic or basic catalyst and sequentially separating the products from each other and from the critical fluid medium, which critical fluid medium can then be recycled back in the process. The process significantly reduces the cost of producing additives or alternatives to automotive fuels and lubricants utilizing inexpensive glyceride- or free fatty acid-containing substances, such as animal fats, vegetable oils, rendered fats, and restaurant grease.

13 Claims, 1 Drawing Sheet

OTHER PUBLICATIONS

H. Michor, R. Marr, T. Gamse, T. Schilling, E. Klingsbichel and H. Schwab, Enzymatic Catalysis in Supercritical Carbon Dioxide: Comparison of Different Lipases and a Novel Esterase, Biotechnology Letters, vol. 18, No. 1, pp. 79–84, (Jan. 1996).

Knez Z, Rizner V., Habulin M., Bauman D., Enzymatic Synthesis of Oleyl Oleate in Dense Fluids, Journal of the American Oil Chemists Society, vol. 72, No. 11 Nov. (1995) pp. 1345–1349.

P. Bernard and D. Barth, Internal Mass Transfer Limitation During Enzymatic Esterification in Supercritical Carbon Dioxide and Hexane, Biocatalysis and Biotransformation, vol. 12, (1995) pp. 299–308.

Z. Knez and M. Habulin, Lipase Catalysed Esterification At High Pressure, Biotechnology and Bioengineering, vol., 9, (1994) pp. 115–121.

Alain Marty, Didier Combes, and Jean–Stephane Condoret, Continuous Reaction–Separation Process for Enzymatic Esterification in Supercritical Carbon Dioxide, Biotechnology and Bioengineering, vol. 43, No. 6, pp. 497–504, Mar. 15, (1994).

Bruce J. Hmjez, Mao Chen, Mike Landwehr, Enzymatic Esterification of 1,2–Butanediol and 1,3 Butanediol in Supercritical Carbon–dioxide Reaction Rate, Regioselectivity, and Stereoselectivity as a Function of Pressure, Abstracts of Papers of the American Chemical Society 207:315–ORGN, Part 2 Mar. 13, 1994.

T. Dumont and D. Barth, Continuous Synthesis of Ethyl Myristate By Enzymatice Reaction in Supercritical Carbon Dioxide, Journal of Supercritical Fluids vol. 6, No. 2, pp. 85–89, Jun. 1993.

Heiki Vija, Artur Telling and Vello Tougu, Lipase–catalysed Esterification in Supercritical Carbon Dioxide and In Hexane, Bioorganic & Medicinal Chemistry Letters, vol. 7, No. 3, pp. 259–262, 1997.

Seung–Heon Yoon, Osato Miyawaki Kwan–Hwa Park and Kozo Nakamura, Transesterification between Triolein and Ethylbehenate by Immobilized Lipase in Supercritical Carbon Dioxide, Journal of Fermentation and Bioengineering, vol. 82, No. 4, 334–340, Jun. 1996.

Yutaka Ikushima and Norio Saito, Promotion of Lipase–catalyzed Esterification of N–Valeric Acid and Citronellol In Supercritical Carbon Dioxide in the Near–critical Region, Journal of Chemical Engineering of Japan vol. 29, No. 3 pp. 551–553, Jun. 1996.

Y. Ikushima, N. Saito, K. Hatekeda and O. Sato, Promotion of A Lipase–Catalyzed Esterification in Supercritical Carbon Dioxide in The Near–Critical Region, Chemical Engineering Science vol. 51, No. 11, pp. 2817–2822 Jun. 1998.

Helga Gunnlaugsdottir, Kristin Wannerberger and Bjorn Sivik, Alcoholysis and Glyceride Synthesis with Immobilized Lipase on Controlled–pore Glass of Varying Hydrophobicity in Supercritical Carbon Dioxide, Enzyme and Microbial Technology, vol. 22, No. 5, pp. 360–367, Apr. 1998.

Helga Gunnlaugsdottir, Anders A. Karlsson, and Bjorn Sivik, Lipase–Catalyzed Alcoholysis with Supercritical Carbon Dioxide Extraction 2: Phase Behavior, Journal of the American Oil Chemists Society, vol. 74, No. 11, pp. 1491–1494, Nov. 1997.

Enrico Cernia and Cleofe Palocci, Lipases in Supercritical Fluids, Lipases, PT B Methods in Enzymology, vol. 286, pp. 495–508 (1997).

Helga Gunnlaugsdottir, Mattias Jaremo and Bjorn Sivik, Process Parameters Influencing Ethanolysis of Cod Liver Oil in Supercritical Carbon Dioxide, Journal of Supercritical Fluids, vol. 12, No. 1, pp. 85–93, Mar. 15, 1998.

Young Min Chi, Kozo Nakamura and Toshimase Yano, Enzymatic Intersterification in Supercritical Carbon–dioxide, Agricultural and Biological Chemistry, vol. 52, No. 6, pp. 1541–1550 Jun. 1988.

Toshiaki Mori, Atsushi Kobayashi and Yoshio Okahata, Biocatalytic Esterification in Supercritical Carbon Dioxide by Using a Lipid–coated Lipase, Chemistry Letters, vol. 9, 921–922, Sep. 1998.

H. Stamatis, V. Sereti and F. N. Kolisis, Studies on the Enzymatic Synthesis of Sugar Esters in Organic Medium and Supercritical Carbon Dioxide, Chemical and Biochemical Engineering Quarterly, vol. 12, No. 3, pp. 151–156, Sep. 1998.

Sophie Colombie, Russell J. Tweddell, Jean–Stepane Condoret and Alain Marty, Water Activity Control: A Way To Improve the Efficiency of Continuous Lipase Esterification, Biotechnology And Bioengineering, vol. 60, No. 3, pp. 362–368, Nov. 5, 1998.

Anita, J. Mesiano, Eric J. Beckman, and Alan J. Russell, Chemical Reviews, vol. 99, No. 2, pp. 623–633, Feb. 1999.

V. Krmeij, M. Habulin, Z. Knez, and D. Bauman, Lipase–catalyzed synthesis of Oleyl Oleate in Preassurized and Supercritical Solvents, FETT–LIPID, vol. 101, No. 1, pp. 34–38, Jan. 1999.

Z. Knez, M. Habulin, V. Krmeij, Enzyme Catalyzed Reactions in Dense Gases, vol. 14, No. 1, pp. 17–29, Oct. 1, 1998.

Marazban Sarkari, Barbara L. Knutson, Ching–Shih Chen, Enzymatic Catalysis in Cosolvent Modified Pressurized Organic Solvents, Biotechnology and Bioengineering, vol. 65, No. 3, pp. 258–264, Nov. 5, 1999.

Jau–Yann Wu and Ming–Tsai Liang, Enhancement of Enantioselectivity by Altering Alcohol Concentration for Esterification in Supercritical CO2, Journal of Chemical Engineering of Japan, vol. 32, No. 3, pp. 338–340, Jun. 1999.

Hui–Ming Yu, Han–Liang Lin, Chi–Yue Wu, Ming–Jen Tseng, Shui–Tein Chen, Narumon Jeyashoke and Kanit Krisnangkura, Enzymatic Reaction in Supercritical Fluid Carbon Dioxide Using Dry–Ice, Journal of the Chinese Chemical Society, vol. 46, No. 5, pp. 647–650, Oct. 1999.

Helga Gunnlaugsdottir, Mattias Jaremo, Bjorn Sivik, Process Parameters Influencing Ethanolysis of Cod Liver Oil in Supercritical Carbon Dioxide, Journal of Supercritical Fluids, vol. 12, No. 1, pp. 85–93, Mar. 15, 1998.

Corinne Vieville, Zephirin Mouloungui, and Antonine Gaset, Esterification of Oleic Acid by Methanol Catalyzed by p–Toluenesulfonic Acid and the Cation–Exchange Resins K2411 and K1481 in Supercritical Carbon Dioxide, Industrial & Engineering Chemistry Research, vol. 32, No. 9, pp. 2065–2068, Sep. 1993.

Takao Ikariya, Philip G. Jessop, and Ryoji Noyori, Chemical Reactions in Supercritical Fluids, Journal of Synthetic Organic Chemistry Japan, vol. 53, No. 5, pp. 358–369, May 1995.

John A. Hyatt, Liquid and Supercritical Carbon Dioxide as Organic Solvents, Journal of Organic Chemistry, vol. 49, No. 26, pp. 5097–5101, 1984.

Bala Subramaniam and Mark A. McHugh, Reactions in Supercritical Fluids—A Review, Industrial & Engineering Chemistry Process Design and Development, vol. 25, No. 1, 1–12, Jan. 1986.

Philip E. Savage, Sudhama Gopalan, Tahmid I. Mizan, Christopher J. Martino, and Eric E. Brock, Reactions at Supercritical Conditions: Applications and Fundamentals, Aiche Journal, vol. 41, No. 7, pp. 1723–1778, Jul. 1995.

Yutaka Ikushima, Supercritical Fluids: An Interesting Medium for Chemical and Biochemical Processes, Advances in Colloid and Interface Science, vol. 71–72, 259–280, Sep. 1, 1997.

L. H McDaniel, L. T. Taylor, Esterification of Decanoic Acid During Supercritical Fluid Extraction Employing Either Methanol–modified Carbon Dioxide or a Methanol Trap, Journal of Chromatography, vol. 858, No. 2, pp. 201–207, Oct. 15, 1999.

Karel Stransky and Tomas Jursik, Simple Quantitative Transesterification of Lipids, FETT–LIPID, vol. 98, No. 2, 65–71, Feb. 1996.

Ma Fangrui, Milford A. Hanna, Biodiesel Production: A Review, Bioresource Technology, vol. 70, No. 1, pp. 1–15, Oct. 1999.

Ahmad R. M. Yahya, William A. Anderson, and Murray Moo–Young, Ester Synthesis in Lipase–catalyzed Reactions, Enzyme and Microbial Technology, vol. 23, Nos. 7–8, pp. 438–450, Dec. 15, 1998.

Paul Mensah, John L. Gainer, Giorgio Carta, Adsorptive Control of Water in Esterification with Immobilized Enzymes: I. Batch Reactor Behavior, Biotechnology and Bioengineering, vol. 60, No. 4, pp. 434–444, Nov. 20, 1998.

E. Cernia, C. Palocci S. Soro, The Role of the Reaction Medium in Lipase–catalyzed Esterifications and Transesterifications, Chemistry and Physics of Lipids, vol. 93, Nos. 1–2, pp. 157–168, Jun. 1998.

M. Trinidad Lopez–Belmonte, Andres R. Alcantara, and Jose V. Sinisterra, Enantioselective Esterification of 2–Arylpropionic Acids Catalyzed By Immobilized Rhizomucor Miehei Lipase, Journal of Organic Chemistry, vol. 62, No. 6, pp. 1831–1840, Mar. 21, 1997.

Tadahiro Murakata, Kazuhisa Yusa, Manabu Yada, Yosihiro Kato and Shimiio Sato, Esterification Activity of Lipasse Entrapped in Reverse Micelles Formed in Liquefied Gas, Journal of Chemical Engineering of Japan, vol. 29, No. 2, pp. 277–281, Apr. 1996.

Maja Habulin, Vlasta Krmeij, and Zeijko Knez, Synthesis of Oleic Acid Esters Catalyzed by Immobilized Lipase, Journal of Agricultural and Food Chemistry, vol. 44, No. 1, pp. 338–342, Jan. 1996.

Philip E. Savage, Sudhama Gopalan, Tahmid I. Mizan, Christopher J. Martino, and Eric E. Brock, Reactions at Supercritical Conditions: Applications and Fundamentals, AICHE Journal, vol. 41, No. 7, Jul. 1995.

Erdogan Kiran, Joan F. Brennecke, Supercritical Fluid Engineering Science Fundamentals and Applications pp. 200–219 Nov. 17–23, 1991.

March, Jerry, "Advanced Organic Chemistry, Reactions, Mechanisms, and Structure," $4^{th}$ Edition, John Wiley & Sons, 1992, pp. 393–396.

* cited by examiner

PROCESS FOR PRODUCING BIODIESEL, LUBRICANTS, AND FUEL AND LUBRICANT ADDITIVES IN A CRITICAL FLUID MEDIUM

This application claims priority from PCT application Ser. No PCT/US99/16669 filed Jul. 22, 1999, published internationally under PCT Article 21(2) in English, which claims priority from United States provisional application Ser. No 60/094,076 filed Jul. 24, 1998.

CONTRACTUAL ORIGIN OF THE INVENTION

The United States has rights in this invention pursuant to Contract No. DE-AC07-94D13223 between the U.S. Department of Energy and Lockheed Martin Idaho Technologies Company.

BACKGROUND OF THE INVENTION

1. Field of the Invention

The present invention relates to a process for producing biofuels as alternatives or additives to currently used petroleum-based automotive or other vehicular fuels and lubricants by reacting fats and oils such as triglycerides and free fatty acids in a single critical phase to provide increased reaction rates and decrease the loss of catalyst or catalyst activity. The invention includes the transesterification of triglyceride-containing substances and esterification of free fatty acid-containing substances with alcohol to produce alkyl esters of triglycerides, a desirable additive or alternative for petroleum diesel fuel or lubricants.

2. Description of the Prior Art

Significant quantities of esters such as triglycerides and free fatty acids are available from inexpensive feedstocks such as, animal fats, vegetable oils, rendered fats, restaurant grease and waste industrial frying oils. The triglyceride esters can be reacted, or transesterified, with alcohol to produce glycerol and the alkyl esters, and the free fatty acid can be reacted, or esterified, with alcohol or water to produce the alkyl ester. These alkyl esters create desirable additives or alternatives to petroleum diesel fuel as well as other high value end products such as detergent surfactants, herbicides, pesticide diluents, sticking agents, or lubricating additives for hydraulic and transmission fluids to name a few. Consequently, numerous patents exist dealing with processes surrounding transesterification of triglycerides and esterification of free fatty acids with alcohols such as methanol, ethanol or butanol to create the corresponding alkyl esters. U.S. Pat. Nos. 5,713,965 and 5,525,126, incorporated herein by reference, are examples of such processes.

The transesterification or esterification reaction is normally carried out in an excess of the stoichiometric quantity of alcohol and a catalyst, usually a base such as potassium hydroxide although, the reaction can also proceed with an acid catalyst as well. In addition to creation of the alkyl esters, the transesterification reaction also produces glycerol.

Traditionally, triglyceride transesterification requires a multiple step process with one or more batch reactors. Initially, the triglycerides and alcohol form two immiscible liquid phases. As the reaction proceeds, two separate liquid phases form. One contains the newly formed alkyl esters of the triglyceride and the other the glycerol with the excess alcohol, catalyst and feed oil being dispersed into both phases. The reaction time for each step typically is measured in hours and once completed the liquid products must be allowed sufficient time to separate phases before additional processing and separation steps can occur to produce the final products. Excess alcohol must be recycled and the unused catalyst typically must be neutralized.

Even the most efficient of the traditional processes require multiple hours to process each batch of feed. Additionally, significant problems arise in the separation steps. Significant quantities of glycerol left in the alkyl esters diminishes the quality of the diesel fuel and likewise contaminated glycerol also loses much of its value compared to pure uncontaminated glycerol. Traditionally the separation procedures necessary to adequately clean the two product streams produces large quantities of waste water thereby creating additional cost and/or process complexity.

SUMMARY AND OBJECTS OF THE INVENTION

This invention provides a single-phase process for producing alkyl esters useful as biofuels and lubricants by the reactions of triglyceride esters and free fatty acids. This invention teaches a process where the reactants enter a reactor, whether batch or continuous, dissolved in a critical fluid. The critical fluid provides a single-phase medium in which diffusion of the reactants into different liquid phases is eliminated, and mass transfer limitations are essentially eliminated thereby increasing the overall reaction rate.

A critical fluid is a fluid whose temperature is within 20% of the critical temperature of the fluid as measured in Kelvin and pressure within 0.5–15 times the critical pressure as modified by any co-solvent.

Additionally, the solubility of the reaction products such as alkyl esters in the critical fluid can be controlled by controlling the reactor's temperature and pressure. Where a reaction product's solubility is low or nonexistent such as glycerol it drops out of the fluid as it is created, thereby driving the reaction equilibrium toward product production which significantly reduces the quantity of excess reactants such as alcohol needed to drive the reaction to completion.

The use of a critical fluid also allows for a wide range of catalysts, both liquid phase and reusable solid phase acid or base catalysts. Solid phase catalysts have significant additional advantages by limiting unwanted side reactions and producing higher conversion rates of the desired products.

With the reaction completed, the critical fluid medium also facilitates clean, efficient separations. The reaction products typically can be sequentially and selectively removed from the critical fluid medium by adjusting the temperature and pressure of the critical fluid medium. In a transesterification reaction of triglycerides, the glycerol is removed first leaving the alcohol esters in the critical fluid. With the glycerol removed, the temperature and pressure is again changed to drop out the alkyl esters. Once the products are removed the critical fluid and any excess reactants are returned to the beginning of the process.

It is the object of the present invention to provide a process for reacting triglyceride- and free fatty acid-containing substances capable of completing the reaction in significantly less time than present conventional processes.

It is another object of the present invention to provide a process for reacting triglyceride- and free fatty acid-containing substances capable of using reusable catalyst thereby avoiding the need for process neutralization.

It is yet another object of the present invention to provide a process for reacting triglyceride- and free fatty acid-containing substances capable of using a solid phase catalyst.

It is yet another object of the present invention to provide a process for reacting triglyceride- and free fatty acid-containing substances with higher yields of desired product over conventional processes.

It is yet another object of the present invention to provide a process for reacting triglyceride- and free fatty acid-containing substances capable of operating in a single phase, thereby eliminating immiscible liquid phases and reducing mass transfer reaction limitations.

It is yet another object of the present invention to provide a process for reacting triglyceride- and free fatty acid-containing substances with improved separation capabilities for separating purified reaction products without the need for washing steps.

It is yet another object of the present invention to provide a process for reacting triglycerides and free fatty acids which can quantitatively react the triglycerides or free fatty acids with significantly less excess alcohol than present processes.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
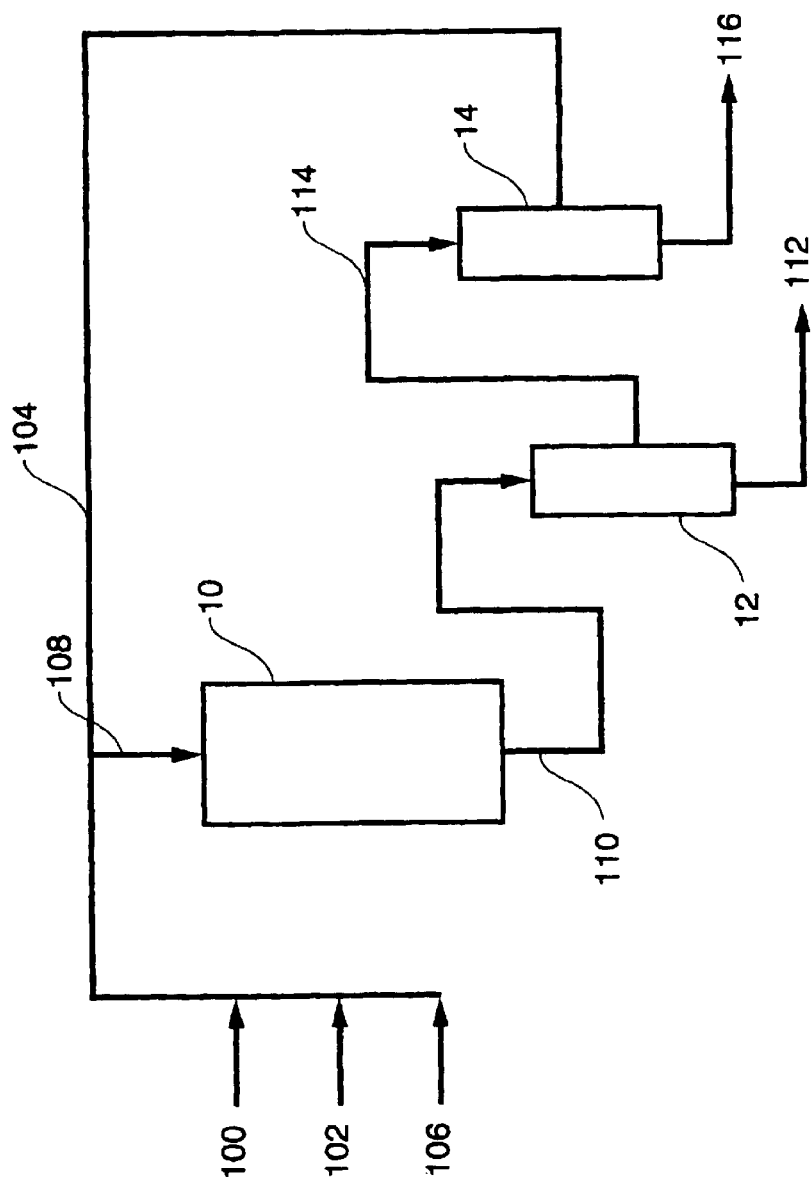
FIG. 1 is a simplified flow diagram which illustrates an embodiment of the invention employing a continuous reactor.

The present invention describes a process for reacting organic compounds having the generic formula $R_1COOR_2$ with short-chain ($C_1$ to $C_4$) alcohols in a single critical fluid phase medium over an acidic or basic catalyst to produce alkyl esters suitable as a biodiesel fuel. One skilled in the art will recognize that organic compounds from the family of compounds known as acylglycerols, fats, oils, waxes, or free fatty acids have the general formula $R_1COOR_2$. One skilled in the art will also recognize that acylglycerols can be mono, di, or tri substituted in any manner. The invention includes the transesterification and esterification of $R_1COOR_2$ molecules with short-chain alcohols such as methanol, ethanol, propanol, or butanol to produce alcohol esters. The invention also encompasses the acid and base catalyzed hydrolysis of $R_1COOR_2$ compounds in a single critical fluid medium where $R_1$ is a chain of aliphatic hydrocarbons ($C_4$ to $C_{36}$), and where $R_2$ can either be glycerol or can be another aliphatic hydrocarbon chain ($C_4$ to $C_{36}$) linked to $R_1$ via the carboxylic ester (BCOO—) linkage. The reaction is generally described as follows:

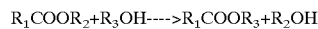

Catalyst

In the case of mono-, di-, and triglycerides, fats and oils, $R_1$ is the aliphatic hydrocarbon ($C_4$ to $C_{24}$) chain, $R_2$ is glycerol and $R_3$ is a hydrocarbon group, and preferably short chain alkyl group, more preferably methyl, ethyl, propyl, or butyl group attached to the alcohol. In the case of free fatty acids, $R_1$ is the aliphatic hydrocarbon chain wherein the terminal carboxylic acid group could be $R_1COO^-$, or $R_1COOH$, or $R_1COO^-\ M^+$ where $M^+$ is a metal (thus, the salt of a fatty acid); and, $R_3$ is the short-chain hydrocarbon attached to the alcohol. In the case of a wax, $R_1$ is an aliphatic hydrocarbon chain linked to $R_2$ via the carboxylic ester linkage, and $R_3$ is the short-chain hydrocarbon attached to the alcohol.

FIG. 1 provides a basic flow diagram for the glyceride reaction process employing a continuous reactor. Throughout the description of the process diagram, the various process vessels will be numbered between 1 and 99, with the various process streams being numbered beginning with 100. While the following discussion will describe a continuous reactor process for a transesterification reaction of glycerides with an alcohol ROH, one skilled in the art will recognize the process principles apply equally well in other process settings such as ones using batch reactors and separation processes as well as reactions producing alternate products to the alcohol esters as well as processes beginning with fatty acid feeds.

A glyceride containing feed 100 is mixed with an input alcohol stream 102. The choice of alcohol will be a function of the desired reaction product, and typically such alcohols as methanol, ethanol, propanol and butanol are chosen for practical reasons, however, one skilled in the art will readily recognize the flexibility of choices and nonlimiting aspect of the above list. This input alcohol stream 102 contains approximately a stoichiometric quantity of alcohol necessary to quantitatively react the input glyceride feed 100. While the reaction will require some excess alcohol, that needed excess is contained in a critical fluid recycle stream 104 which provides a transport medium that solvates the reactants to create the required process conditions. The exact critical fluid employed for a given reaction will depend on specifically chosen process parameters such as temperature, pressure, desired reaction products, solubility of the reaction products, quantity of excess alcohol needed to drive the reaction to completion, post reaction separation processes and chosen catalyst. Examples of possible critical fluid solvents are carbon dioxide, sulfur dioxide, methane, ethane, propane, or mixtures thereof, with or without critical fluid co-solvents such as methanol, ethanol, butanol or water. Naturally, to the extent quantities of the critical fluid are lost during the process they can be replenished with a critical fluid make-up stream 106.

The mixing of the input feed 100 (substance containing free fatty acids and/or glycerides), the input alcohol 102, the critical fluid recycle 104 and critical fluid make-up 106 streams creates a reactant input stream 108 which is fed into a continuous reactor 10. The temperature and pressure of the reactant input stream will depend on its components and the desired process parameters. The important criteria for the critical fluid is its ability to dissolve the reactants. Reaction temperatures should be within 20% of the critical temperature of the fluid as measured in Kelvin, and pressures within 0.5–15 times critical pressure as modified by any co-solvent. Reaction temperatures are typically in the range from about 20 to 200 degrees C. with reaction pressures in the range from about 150 psig to 4000 psig.

The transesterification reaction generally proceeds in the presence of a catalyst, either acidic or basic. Liquid acids and bases, such as the common inorganic acids HCl, $H_2SO_4$ and $HNO_3$ and inorganic bases NaOH and KOH typically provide the needed catalytic activity. Additionally, the use of a critical fluid medium allows for use of a solid phase catalysts with either acidic or basic surfaces such as microporous crystalline solids, such as zeolites, and noncrystalline inorganic oxides such as alumina, silica, silica-alumina, boria, oxides of phosphorus, titanium dioxide, zirconium dioxide, chromia, zinc oxide, magnesia, calcium oxide, iron oxides, unmodified, or modified with chlorine, fluorine, sulfur or an acid or base, as well as mixtures of the above group or an exchange resin with either acidic or basic properties. Where solid catalysts are used in the reactor 10, they may create a catalytic packed bed or float free inside the reactor.

As the reaction proceeds, glycerol and the alkyl esters of the glyceride are produced. Glycerol has low solubility in critical fluids such as $CO_2$ and propane which will cause the glycerol product to drop out of the critical fluid medium. This removal of the glycerol from the reaction phase of the critical fluid medium will enhance the reaction equilibrium and drive the reaction further to completion with limited excess alcohol. One skilled in the art will then recognize that the quantity of excess alcohol required to drive the reaction to completion will depend not only on such factors as the desired reaction rate, but also the glycerol solubility in the chosen critical fluid.

The ability of the critical fluid medium to solvate the reactants eliminates the immiscible phases found in conventional processes. The single phase reaction eliminates interphase mass transfer of the individual reactants and catalyst, thereby greatly increasing the reaction's rate.

After completion of the reaction the reaction vessel may be the separation vessel, a final product stream 110 exits the reactor 10 and enters a first product separator 12. In the first product separator 12 the product stream's temperature and/or pressure are modified to allow the least soluble product in the critical fluid to quantitatively drop out, the glycerol in this embodiment. Once the glycerol has dropped out of the critical fluid medium, a physical separation of the two phases can be readily accomplished. A glycerol product stream 112 and a glycerol depleted product stream 114 exits the first separator 12. The glycerol depleted product stream 114 consists of the critical fluid, excess alcohol, alcohol ester of the glycerides and any remaining catalyst, if a liquid catalyst is used, and then enters a second product separator 14. Again the temperature and pressure of the critical fluid are lowered to allow the desired product, the alkyl ester of the glyceride of this embodiment, to drop out of the critical fluid while retaining the excess alcohol in the critical fluid. The physical separation of the two phases then creates a second product stream of the alcohol ester 116 and the critical fluid recycle 104 which will be reintroduced back into the front of the process after having its pressure and temperature restored to the original input reaction requirements.

While this embodiment describes a process with two product streams, the glycerol and alkyl ester, it should also be apparent to one skilled in the art that a reaction producing more than two products can produce multiple product streams by simply increasing the number of product separators.

Although the present invention has been described with reference to preferred embodiments, those skilled in the art will recognize that changes may be made in form and detail without departing from the spirit and scope of the invention.

We claim:

1. A process for producing alkyl esters useful in biofuels and lubricants, the process comprising:

providing an organic composition comprising at least one component selected from the group consisting:

providing a critical fluid medium including at least one fluid selected from the group consisting of carbon dioxide, sulfur dioxide, methane, ethane, propane, and mixtures thereof;

dissolving the organic composition and either a $C_1$–$C_4$ short chain alcohol or water into the critical fluid medium;

reacting the organic composition with the short chain alcohol or water in the presence of a catalyst in a single phase to produce a final product comprising an alkyl ester and glycerol, wherein the glycerol leaves the single phase as it is formed;

separating the glycerol from the alkyl ester; and separating the alkyl ester from the critical fluid medium, wherein the particular critical fluid medium is selected so that, when combined with the organic composition, the critical fluid medium provides decreased loss of catalyst or catalytic activity and elimination of mass transfer limitations by maintaining the various reactants in a single phase.

2. The process of claim 1, wherein dissolving the organic composition and either a $C_1$–$C_4$ short chain alcohol or water into the critical fluid medium comprises dissolving the organic composition and the short chain alcohol selected from the group consisting of ethanol, methanol, propanol, butanol, isopropanol and isobutanol into the critical fluid medium.

3. The process of claim 1, wherein reacting the organic composition with the short chain alcohol or water in the presence of a catalyst comprises reacting the organic composition in the presence of a liquid phase catalyst.

4. The process of claim 3, wherein reacting the organic composition in the presence of a liquid phase catalyst comprises reacting the organic composition in the presence of the liquid phase catalyst selected from the group consisting of HCl, $H_2SO_4$, $HNO_3$, NaOH, and KOH.

5. The process of claim 1, wherein reacting the organic composition with the short chain alcohol or water in the presence of a catalyst comprises reacting the organic composition in the presence of a solid phase catalyst.

6. The process of claim 5, wherein reacting the organic composition in the presence of a solid phase catalyst comprises reacting the organic composition in the presence of a microporous crystalline solid.

7. The process of claim 5, wherein reacting the organic composition in the presence of a solid phase catalyst comprises reacting the organic composition in the presence of an exchange resin with either acidic or basic properties.

8. The process of claim 5, wherein reacting the organic composition in the presence of a solid phase catalyst comprises reacting the organic composition in the presence of an inorganic oxide selected from the group consisting of alumina, silica, silica-alumina, boria, oxides of phosphorus, titanium dioxide, zirconium dioxide, chromia, zinc oxide, magnesia, ion exchange resins, silicate catalysts, and calcium oxide either unmodified or modified with chlorine, fluorine, sulfur or an acid or base.

9. The process of claim 1, further comprising recycling the critical fluid medium for use in a later reaction.

10. The process of claim 1, wherein providing a critical fluid medium comprises providing the critical fluid medium optionally including a critical fluid co-solvent selected from the group consisting of methanol, ethanol, butanol, and water.

11. A process for producing alkyl esters useful in biofuels and lubricants, the process comprising:

providing an organic composition comprising at least one component selected from the group consisting:

providing a critical fluid medium including at least one fluid selected from the group consisting of carbon dioxide, sulfur dioxide, methane, ethane, propane, and mixtures thereof, and optionally including at least one critical fluid co-solvent selected from the group consisting of methanol, ethanol, butanol, and water;

dissolving the organic composition and either a $C_1$–$C_4$ short chain alcohol or water into the critical fluid medium;

reacting the organic composition with the short chain alcohol or water in the presence of a catalyst in a single phase to produce a final product comprising an alkyl ester and glycerol, wherein the glycerol leaves the single phase as it is formed;

separating the glycerol from the final product by modifying the temperature and pressure of the final product; and separating the alkyl ester product from the critical fluid medium by modifying the temperature and pressure of the critical fluid medium.

12. A process for producing alkyl esters useful in biofuels and lubricants, the process comprising:

providing an organic composition comprising at least one component selected from the group consisting:

providing a critical fluid medium including at least one fluid selected from the group consisting of carbon dioxide, sulfur dioxide, methane, ethane, propane, and mixtures thereof;

dissolving the organic composition and either a $C_1$–$C_4$ short chain alcohol or water into the critical fluid medium; and reacting the organic composition with the short chain alcohol or water in the presence of a catalyst at a temperature from about 20° C. to about 200° C. and a pressure from about 150 psig to about 4000 psig, wherein the reaction occurs in a single phase to produce a final product comprising an alkyl ester and glycerol and wherein the glycerol leaves the single phase as the glycerol is formed;

wherein the critical fluid medium is selected such that a reaction temperature is within about 20% of a critical temperature of the critical fluid medium and a reaction pressure is within about 0.5 to about 15 times a critical pressure of the critical fluid medium as modified by a co-solvent.

13. A process for producing alkyl esters useful in biofuels and lubricants, the process comprising:

providing an organic composition comprising at least one component selected from the group consisting:

dissolving the organic composition and a $C_1$–$C_4$ short chain alcohol or water into a critical fluid medium, wherein the critical fluid medium is at least one fluid selected from the group consisting of carbon dioxide, sulfur dioxide, methane, ethane, and propane, and mixtures thereof, the critical fluid medium solubilizing the organic composition and the $C_1$–$C_4$ short chain alcohol or water into a single phase;

reacting the organic composition with the $C_1$–$C_4$ short chain alcohol or water in the presence of a catalyst in the single phase to produce a final product stream comprising an alkyl ester and glycerol;

separating the glycerol from the final product stream by modifying a temperature and pressure of the critical fluid medium; and separating the alkyl ester from the critical fluid medium by modifying the temperature and pressure of the critical fluid medium.

* * * * *

UNITED STATES PATENT AND TRADEMARK OFFICE
CERTIFICATE OF CORRECTION

PATENT NO. : 6,887,283 B1  Page 1 of 1
APPLICATION NO. : 09/554708
DATED : May 3, 2005
INVENTOR(S) : Daniel M. Ginosar and Robert V. Fox It is certified that error appears in the above-identified patent and that said Letters Patent is hereby corrected as shown below:

Claim 1, Column 5, Line 64: change "providing an organic composition comprising at least one component selected from the group consisting:" to "providing an organic composition comprising at least one component selected from the group consisting of acylglycerols, fats, and oils;"

Claim 11, Column 6, Line 66: change "providing an organic composition comprising at least one component selected from the group consisting:" to "providing an organic composition comprising at least one component selected from the group consisting of acylglycerols, fats, and oils;"

Claim 12, Column 7, Line 24: change "providing an organic composition comprising at least one component selected from the group consisting:" to "providing an organic composition comprising at least one component selected from the group consisting of acylglycerols, fats, and oils;"

Claim 13, Column 8, Line 14: change "providing an organic composition comprising at least one component selected from the group consisting:" to "providing an organic composition comprising at least one component selected from the group consisting of acylglycerols, fats, and oils;"

Signed and Sealed this

Seventh Day of April, 2009

JOHN DOLL
*Acting Director of the United States Patent and Trademark Office*